(12) United States Patent
Stojanovski (10) Patent No.: US 11,161,179 B2
(45) Date of Patent: Nov. 2, 2021

(54) CUTTING TOOL ASSEMBLY

(71) Applicant: Stojan Stojanovski, Shelby Township, MI (US)

(72) Inventor: Stojan Stojanovski, Shelby Township, MI (US)

(73) Assignee: Stojan Stojanovski, Shelby Township, MI (US)

( * ) Notice: Subject to any disclaimer, the term of this patent is extended or adjusted under 35 U.S.C. 154(b) by 0 days.

(21) Appl. No.: 16/850,626

(22) Filed: Apr. 16, 2020

(65) Prior Publication Data

US 2020/0238405 A1  Jul. 30, 2020

Related U.S. Application Data

(63) Continuation of application No. 16/180,269, filed on Nov. 5, 2018, which is a continuation-in-part of (Continued)

(51) Int. Cl.
*B23B 31/107* (2006.01)
*B23C 5/10* (2006.01)
(Continued)

(52) U.S. Cl.
CPC ........ *B23B 31/005* (2013.01); *B23B 31/1076* (2013.01); *B23C 5/10* (2013.01);
(Continued)

(58) Field of Classification Search
CPC ............ B23B 31/1075; B23B 31/1076; B23B 2231/46; B23B 2265/12; B23B 2251/02; B23B 31/005; B23B 2265/32; B23B 2231/0216–0244; B23B 2231/0204; Y10T 407/1932; Y10T 407/1934; Y10T 279/17846; Y10T 279/17821; Y10T 279/14; Y10T 409/309408; Y10T 408/907; B23C 5/10; B23C 2210/02; B23C 2210/03; B23C 5/26; B23C 5/2472; B23C 2240/24
See application file for complete search history.

(56) References Cited

U.S. PATENT DOCUMENTS 2,768,831 A * 10/1956 Bellmann ......... B23B 29/03407
                                                    279/6
3,091,474 A *  5/1963 Boutros .............. B23B 31/1078
                                                    279/97
(Continued)

FOREIGN PATENT DOCUMENTS

DE   102016005081 A1 * 11/2017  ........... B23B 31/023
WO   WO-2012111710 A1 *  8/2012  ........... B23B 31/005

*Primary Examiner* — Eric A. Gates
*Assistant Examiner* — Chwen-Wei Su
(74) *Attorney, Agent, or Firm* — Quinn IP Law (57) ABSTRACT

A cutting tool assembly includes a tool body and a tool holder including a longitudinal axis around which the tool holder is configured to spin. The tool holder includes a central portion connected to the tool body comprising a fastener hole perpendicular with the longitudinal axis and configured to receive a securing fastener, wherein the fastener hole is offset from the longitudinal axis. The tool holder further includes an eccentric drive member connected to the cylindrical portion. The tool holder can optionally further include an end alignment cylinder connected to the eccentric drive member.

5 Claims, 8 Drawing Sheets

Related U.S. Application Data application No. 15/485,945, filed on Apr. 12, 2017, now Pat. No. 10,682,710.

(51) Int. Cl.
*B23B 31/00* (2006.01)
*B23C 5/24* (2006.01)

(52) U.S. Cl.
CPC ... *B23B 2231/0204* (2013.01); *B23B 2265/32* (2013.01); *B23C 5/2472* (2013.01); *B23C 2210/02* (2013.01); *B23C 2210/03* (2013.01); *B23C 2240/24* (2013.01)

(56) References Cited

U.S. PATENT DOCUMENTS

| | | | | |
|---|---|---|---|---|
| 3,139,800 A * | 7/1964 | Frank | ................... | B23C 5/26 |
| | | | | 407/48 |
| 3,274,862 A * | 9/1966 | Babich | ................... | B23B 29/03 |
| | | | | 408/197 |
| 3,586,344 A * | 6/1971 | Nixon | ................... | B23B 31/02 |
| | | | | 279/3 |
| 3,630,534 A * | 12/1971 | Better | ................... | B23B 31/117 |
| | | | | 409/232 |
| 4,265,460 A * | 5/1981 | Senzaki | ................... | B23B 31/1078 |
| | | | | 279/97 |
| 6,341,926 B1 * | 1/2002 | Liu | ................... | B23B 31/005 |
| | | | | 408/222 |
| 8,226,337 B2 * | 7/2012 | Komine | ................... | B23B 31/083 |
| | | | | 408/238 |
| 8,602,694 B2 * | 12/2013 | Morgulis | ................... | B23G 5/18 |
| | | | | 407/25 |
| 2017/0304912 A1 * | 10/2017 | Schuessler | ................... | B23B 31/028 |

\* cited by examiner

CUTTING TOOL ASSEMBLY

CROSS-REFERENCE TO RELATED APPLICATIONS

This disclosure is a continuation of U.S. patent application Ser. No. 16/180,269 filed on Nov. 5, 2018 which is a continuation in part of U.S. patent application Ser. No. 15/485,945 filed on Apr. 12, 2017, both of which are hereby incorporated by reference.

TECHNICAL FIELD

This disclosure is related to an apparatus useful to align and secure a cutting tool assembly to a mating tool driver assembly. In particular, the disclosure is related to a configuration useful to secure the cutting tool assembly and easily release the tool at the completion of a cutting task.

BACKGROUND

The statements in this section merely provide background information related to the present disclosure. Accordingly, such statements are not intended to constitute an admission of prior art.

A cutting tool assembly is configured to receive an input torque from a mating tool driver assembly. The cutting tool assembly includes at least one cutting edge upon a tool tip that utilizes the input torque to cut a workpiece.

U.S. Pat. No. 5,468,102 titled "Milling Tool Holder" for which the present applicant was the sole inventor discloses one previously known method and apparatus for securing a cutting tool assembly to a mating tool driver and is included herein by reference. According to this reference, a tool holder portion of a cutting tool assembly is provided with a cylindrical section. A pair of conically shaped screw cavities can be formed in opposite sides of the cylindrical section, such that when the cylindrical portion is inserted within a mating cylindrical cavity in a mating tool driver, a pair of threaded fasteners can be used to lock the tool holder portion into place. This design has a number of advantages, however, it also includes a drawback that the screws together bear a large or majority portion of the input torque applied to the tool through the mating tool driver. This input torque applied to the fasteners can damage the fasteners, which can have a number of adverse affects including making disassembly of the tool difficult or impossible. Some tools must be destroyed when the fasteners deform too much after rough use.

U.S. Pat. No. 8,360,699 titled "Cutting Tool Assembly with an Eccentric Drive Member" for which the present applicant was the sole inventor discloses one previously known method and apparatus for securing a cutting tool assembly to a mating tool driver and is included herein by reference. According to this reference, a tool holder portion of a cutting tool assembly is provided with a first conical portion attached to a second eccentric or oval shaped drive member portion, with a third cylindrical portion including a locking mechanism. An eccentric drive member provides a benefit, enabling the tool to be rotated within the mating tool driver, with surfaces of an eccentric drive member aligning to a mating oval shaped cavity. In this way, an eccentric drive member can transmit torque from the mating tool driver to the cutting tool assembly without deforming a plurality of set screws. This design has a number of advantages; however, it also includes a drawback that the conical section and a mating conical cavity in the mating tool driver must be constructed to tight tolerances in order to ensure proper tool alignment. Such tight tolerances slow manufacturing time of the cutting tool assembly and introduce a source of tool malfunction, in that any small deformity or damage to the conical section can invalidate the tool or require intensive repair of the conical section to realign the tool. Further, because the conical section, by increasing in size toward the flat collar section joining the tool holder portion to the rest of the cutting tool assembly body, the size of that flat collar is reduced. This increases an ability of the tool to cant or tilt slightly within the cavity of the mating tool driver. Combined with tool strain created while cutting through a work piece, this tilt can lock the cutting tool assembly within the mating tool driver. As a result, in order to remove the cutting tool assembly from the mating tool driver, one must frequently use a hammer to knock the cutting tool assembly loose from the mating tool driver, frequently causing damage or increased wear to the cutting tool assembly.

SUMMARY

A cutting tool assembly includes a tool body and a tool holder including a longitudinal axis around which the tool holder is configured to spin. The tool holder includes a central portion connected to the tool body comprising a fastener hole perpendicular with the longitudinal axis and configured to receive a securing fastener, wherein the fastener hole is offset from the longitudinal axis. The tool holder further includes an eccentric drive member connected to the cylindrical portion. The tool holder can optionally further include an end alignment cylinder connected to the eccentric drive member.

BRIEF DESCRIPTION OF THE DRAWINGS

One or more embodiments will now be described, by way of example, with reference to the accompanying drawings, in which:

FIGS. 7A and 7B illustrate an exemplary tool holder configuration of a known prior art tool holder, including a conical section used to align the tool holder to a mating cavity, in accordance with the present disclosure;

FIGS. 8A and 8B illustrate an exemplary tool holder configuration according to the present application, in accordance with the present disclosure;

DETAILED DESCRIPTION

A tool holder portion of a cutting tool assembly includes a cylindrical alignment portion and an eccentric drive member portion. The cylindrical alignment portion can include a fastener cavity configured to accept a threaded fastener in order to secure the tool holder within a mating cavity. The eccentric drive member portion is configured to be aligned with a mating eccentric cavity within a mating tool driver, such that a portion of input torque transmitted from the mating tool driver to the cutting tool assembly is transmitted through the eccentric drive member, with the fastener transmitting one of a portion of the input torque or none of the input torque.

Figure 1:
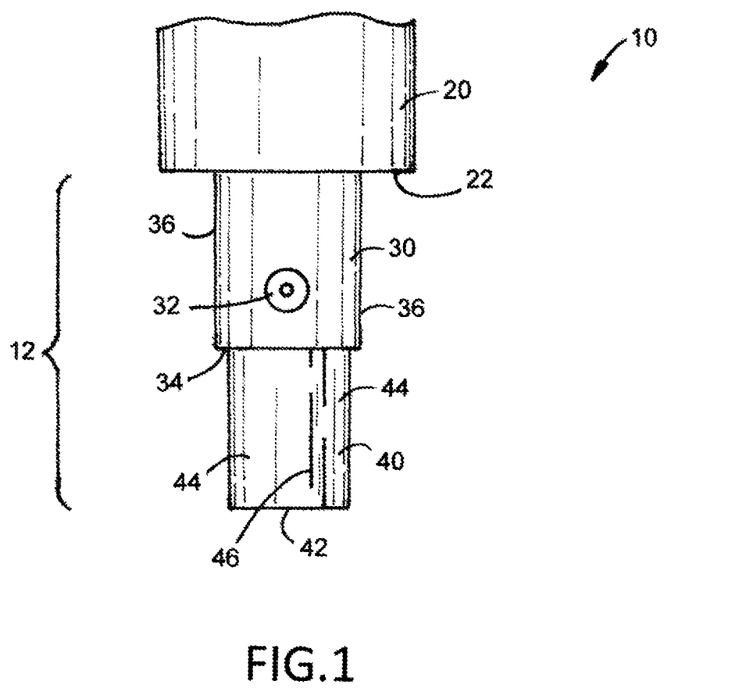
FIG. 1 illustrates an exemplary cutting tool assembly including a tool holder and a cutting tool body, including a cylindrical portion, a trigon portion, and a fastener hole, in accordance with the present disclosure.

Referring now to the drawings, wherein the showings are for the purpose of illustrating certain exemplary embodiments only and not for the purpose of limiting the same, FIG. 1 illustrates an exemplary cutting tool assembly 10 including tool holder 12 and cutting tool body 20. Tool holder 12 includes cylindrical portion 30 and trigon portion 40. Tool holder 12 is configured to be inserted within a tool driver assembly, which provides input torque to the cutting tool assembly 10. Tool holder 12 is configured to removably affix the cutting tool assembly 10 to the tool driver assembly, providing a precisely controllable cutting tool edge or edges while enabling easy removal of the cutting tool assembly 10 from the tool driver assembly after a cutting task is complete.

Cylindrical portion 30 includes substantially parallel side walls 36. Fastener hole 32 permits a fastener to be used to lock the tool holder 12 into place within the tool driver assembly. Cutting tool body 20 includes a wider radius than cylindrical portion 30. Cylindrical portion 30 is attached to flat bottom face 22 of cutting tool body 20. Cylindrical portion 30 serves as a first contact point with the mating tool driver assembly, locating the cutting tool assembly through precise fitting of the cylinder shape to a mating cylinder cavity and fixing that spatial relationship with a fastener affixed though the tool driver assembly to fastener hole 32. The cylinder shape further prevents the cutting tool assembly 10 from canting or tilting within the tool driver assembly cavity, thereby preventing a tool lock condition.

Trigon portion 40 includes an eccentric drive member including a substantially curved triangular cross-section defined by three flatter arcuate faces 44 separated by three rounded vertices 46. Trigon portion 40 is attached to bottom flat face 34 of cylindrical portion 30 and includes a flat bottom face 42. Trigon portion 40 is configured be inserted into a similar shaped trigon cavity within the mating tool driver assembly, wherein the cavity within the mating tool driver assembly is slightly larger than trigon portion 40. Trigon portion 40, once within the mating cavity, is slightly rotated in an opposite direction which torque is applied through the tool, such that three of the faces 44 are abutted and in contact with mating faces of the mating cavity. The faces 44 of the trigon portion 40, in contact with the mating cavity, serve as a second contact point with the mating tool driver assembly. The triangular cross section of trigon portion 40, portion in other embodiments, can be substituted with an eccentric drive member with a similar oval or rounded square.

Figure 2:
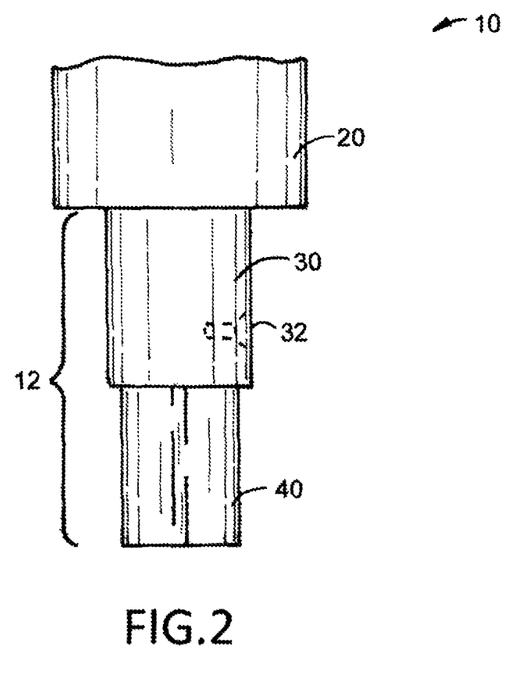
FIG. 2 illustrates the cutting tool assembly of FIG. 1 in side view, in accordance with the present disclosure.

FIG. 2 illustrates the cutting tool assembly 10 of FIG. 1 in side view. Cutting tool assembly 10 includes cutting tool body 20 and tool holder 12 including cylindrical portion 30 and trigon portion 40. Fastener hole 32 is illustrated in profile.

Figure 3:
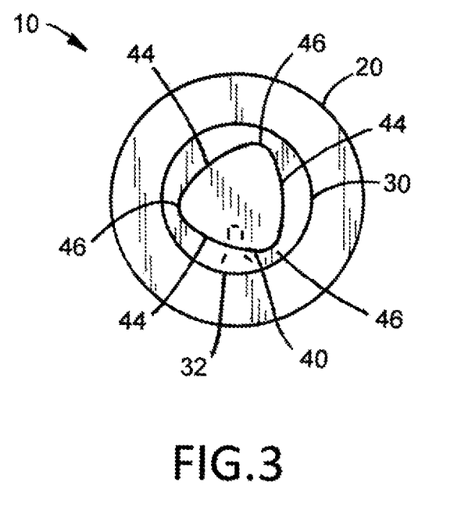
FIG. 3 illustrates the cutting tool assembly of FIG. 1, viewed from the bottom, in accordance with the present disclosure.

FIG. 3 illustrates the cutting tool assembly 10 of FIG. 1, viewed from the bottom. Cutting tool assembly 10 includes cutting tool body 20. Further, cylindrical portion 30 is illustrated including fastener hole 32. Further, trigon portion 40 is illustrated including a substantially curved triangular cross-section defined by three flatter arcuate faces 44 separated by three rounded vertices 46.

Figure 4:
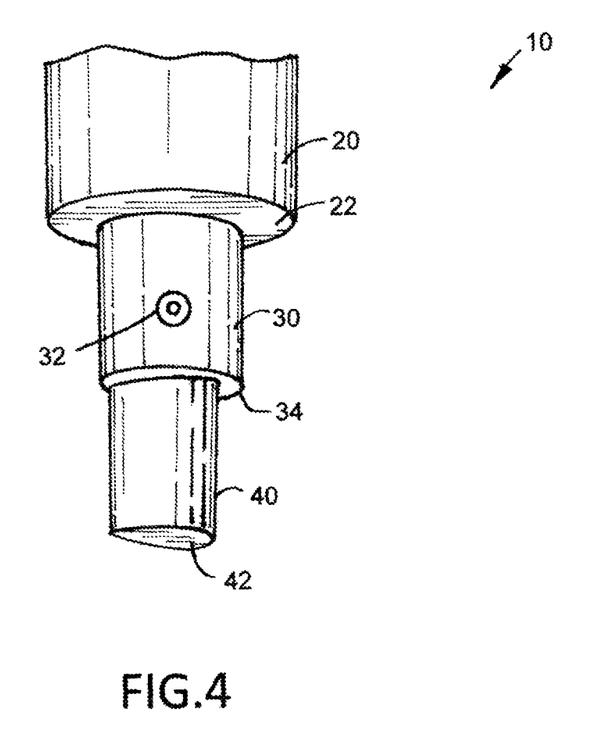
FIG. 4 illustrates the cutting tool assembly of FIG. 1 in perspective view, in accordance with the present disclosure.

FIG. 4 illustrates the cutting tool assembly 10 of FIG. 1 in perspective view. Cutting tool assembly 10 includes cutting tool body 20 including flat bottom face 22, cylindrical portion 30 including flat bottom face 32, and trigon portion 40 including flat bottom face 42. Fastener hole 32 is illustrated.

Figure 5:
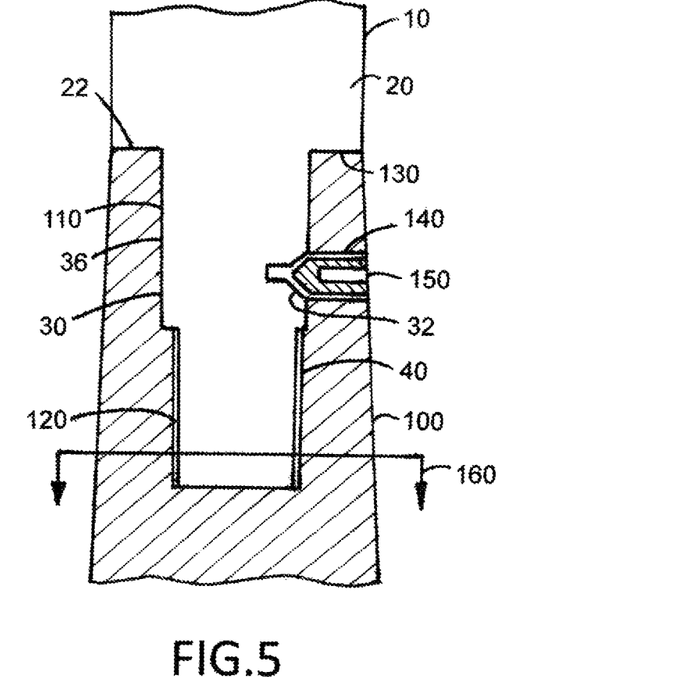
FIG. 5 illustrates the cutting tool assembly of FIG. 1 inserted within an exemplary mating tool driver assembly in cross-section, in accordance with the present disclosure.

FIG. 5 illustrates the cutting tool assembly 10 of FIG. 1 inserted within an exemplary mating tool driver assembly 100 in cross-section. Cutting tool assembly 10 includes cutting tool body 20 including flat bottom face 22, cylindrical portion 30, and trigon portion 40. Tool driver assembly 100 includes flat face 130 mating to bottom flat face 22, cylindrical shaped cavity 110 mating to walls 36 of cylindrical portion 30, and trigon shaped cavity 120 mating to trigon portion 40. Fastener 150 is illustrated inserted within cavity 140 of tool driver assembly 150 affixed within fastener hole 32. Section 160 is provided for illustration in related FIG. 6.

FIG. 5 illustrates cylindrical portion 30 and bottom flat face 22. Parallel side walls 36 of cylindrical portion 30 are substantially perpendicular to bottom flat face 22. Whereas the configuration of U.S. Pat. No. 8,360,699 includes a conical section, where side walls of that section engage with mating cavity walls based upon how far the tool holder is inserted into the cavity. Alignment of the side walls to that previous design are dependent upon full engagement of the tool holder, and if in the straining and related deformation of the tool as torque is transmitted through the tool the walls are no longer fully engaged, alignment of the tool can be compromised. The present configuration is superior to that previous configuration because cylindrical portion 30, with walls parallel to a longitudinal axis of the tool holder, aligns with the mating cylindrical shaped cavity 110 regardless of strain and deformation of cylindrical portion 30. Unlike a conical section, alignment of cylindrical portion 30 to the mating cavity is not dependent upon the portion being firmly seated with the mating cavity in an axial direction.

Figure 7A:
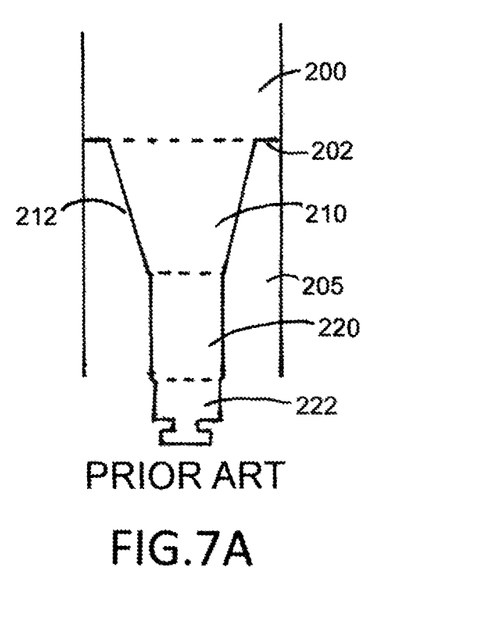
FIG. 7A illustrates the tool holder and mating cavity in an initial unstressed condition.
Figure 7B:
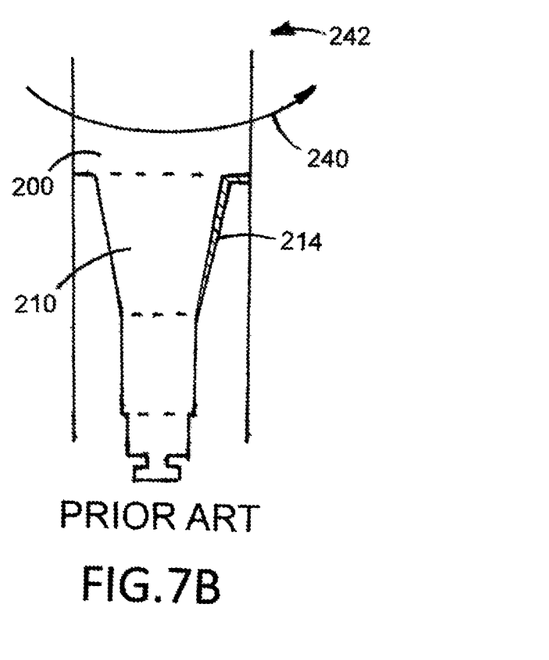
FIG. 7B illustrates the tool holder and mating cavity of FIG. 7A in a stressed state, with a torque and a lateral force applied thereto.

FIGS. 7A and 7B illustrate an exemplary tool holder configuration of a known prior art tool holder, including a conical section used to align the tool holder to a mating cavity. FIG. 7A illustrates the tool holder and mating cavity in an initial unstressed condition. Cutting tool assembly 200 is illustrated including conical portion 210, eccentric driver portion 220, and retention portion 222. Conical portion 210 includes side walls 212 which are angled in relation to a longitudinal axis of the tool. Bottom flat face 202 connects conical portion 210 with a body of the tool assembly. Retention portion 222 locks into mating features in mating tool driver 205. In the relaxed state of FIG. 7A, side walls 212 align with walls of the mating cavity in mating tool driver 205.

FIG. 7B illustrates the tool holder and mating cavity of FIG. 7A in a stressed state, with a torque 240 and a lateral force 242 applied thereto. As stress is applied to cutting tool assembly 200, the tool assembly deforms. In the exemplary illustration of FIG. 7B, gap 214 is illustrated between conical portion 210 and the neighboring cavity wall. This visible gap is provided for purposes of illustration, whereas deformation in actual parts under stress can be significant although less visible to an ordinary observer. With the creation of gap 214, the original alignment of the tool holder of cutting tool assembly 200 and the mating tool driver can be disturbed, with the deformed pieces returning to a different alignment than the original alignment. This can create a tool lock condition, where some of the deformation in the pieces remains and locks the pieces together, requiring a mitigating act such as a hammer strike to separate the tool pieces.

Figure 8A:
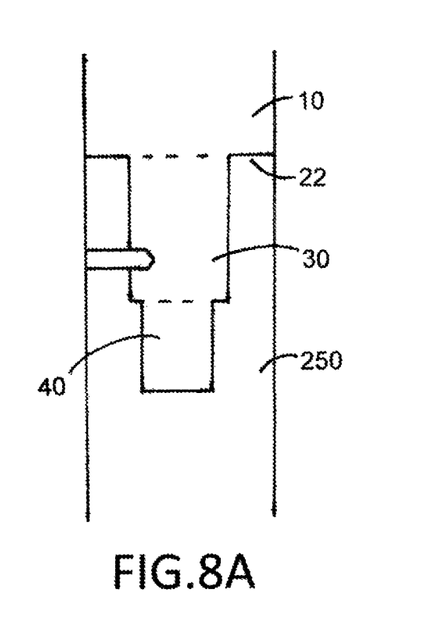
FIG. 8A illustrates the exemplary tool holder of the cutting tool assembly in an initial unstressed state.
Figure 8B:
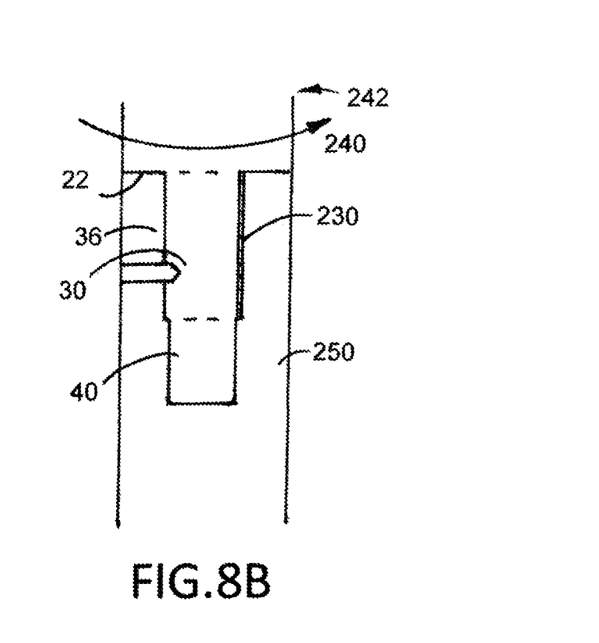
FIG. 8B illustrates the cutting tool assembly of FIG. 8A in a stressed state, with a torque and a lateral force applied thereto.

FIGS. 8A and 8B illustrate an exemplary tool holder configuration according to the present application. FIG. 8A illustrates the exemplary tool holder of the cutting tool assembly in an initial unstressed state. Cutting tool assembly 10 is illustrated including cylindrical portion 30 and trigon portion 40, with bottom flat surface 22 joining cylindrical portion 30 to a main body of cutting tool assembly 10. Cutting tool 10 is illustrated within a mating tool driver 250.

FIG. 8B illustrates cutting tool assembly 10 of FIG. 8A in a stressed state, with a torque 240 and a lateral force 242 applied thereto. As stress is applied to cutting tool assembly 10, the tool assembly deforms. However, alignment of the tool holder within the cavity of mating tool driver 250 is dependent upon parallel side walls 36 of cylindrical portion 30 aligning with the parallel side walls of the mating cylindrical shape cavity of mating tool driver 250. Gap 230 caused by deformation of cutting tool assembly 10 typically creates space between parallel walls 36 and the mating cavity walls. Upon removing stress from the pieces, the cylindrical walls tend to relax to their original alignment or include less residual stress than the pieces of FIG. 7B. Further, bottom flat face 22, including a larger surface area than a comparable bottom flat face 202 of FIG. 7A due to the widening radius of the conical portion, tends to keep the cutting tool assembly 10 in alignment with the mating surface of mating tool driver 250. As a result, cutting tool assembly 10 of FIG. 8B exhibits easier decoupling and less opportunity to damage the tools than the cutting tool assembly of FIG. 7B.

Figure 6:
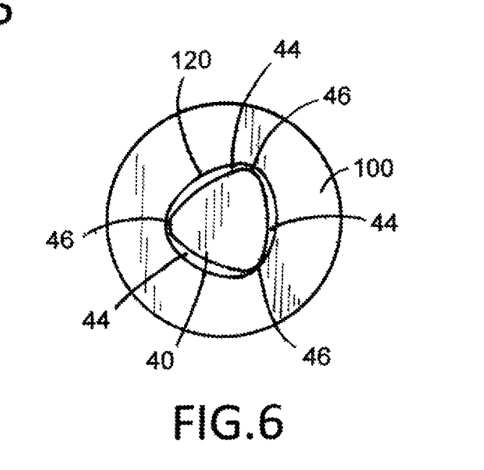
FIG. 6 illustrates the trigon portion of FIG. 5 within a trigon shaped cavity of mating tool driver, in cross section, in accordance with the present disclosure.

FIG. 6 illustrates the trigon portion 40 of FIG. 5 within trigon shaped cavity 120 of tool driver assembly 100, in cross section as defined by section 160 of FIG. 5. Trigon portion 40 includes a substantially curved triangular cross-section defined by three flatter arcuate faces 44 separated by three rounded vertices 46. As the trigon portion 40 is rotated within cavity 120, faces 44 come into contact with mating walls of cavity 120.

The cutting tool assembly of the present disclosure can include any number of known cutting instruments or tooling, included but not limited to an endmill, a ballmill, a drill, an indexable cutter, a modular cutter, and a chuck for attaching various bits.

Figures 9, 10:
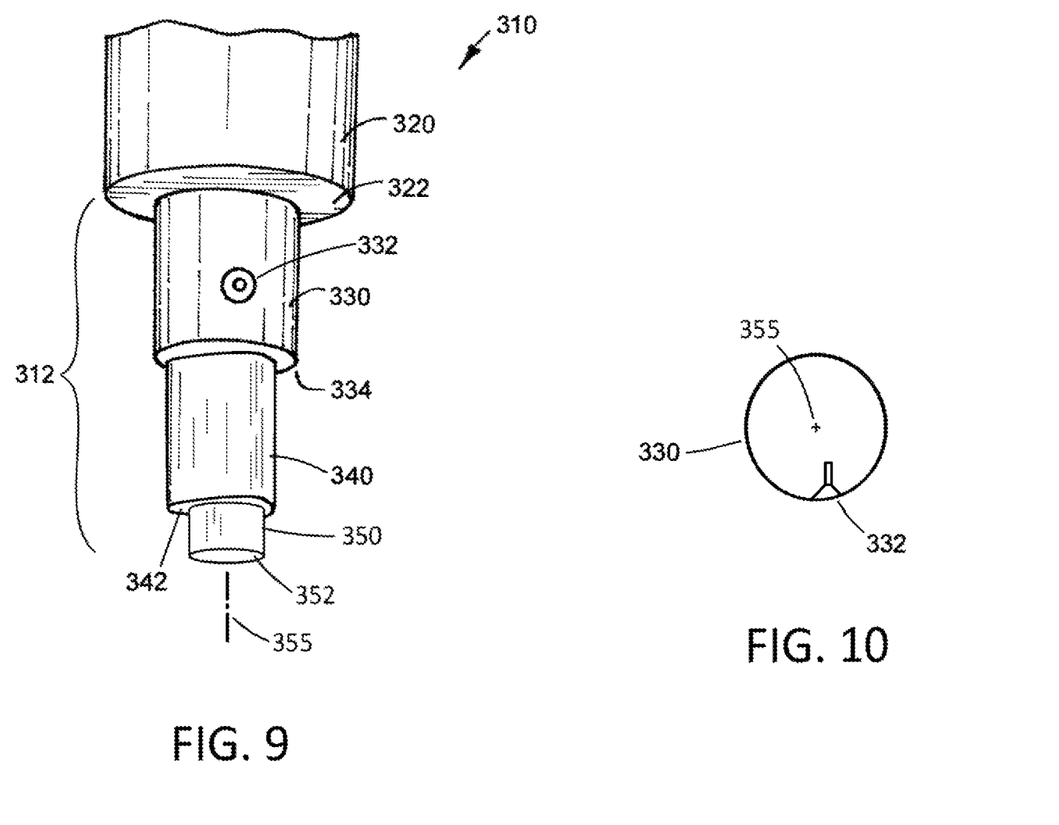
FIG. 9 illustrates an alternative embodiment of an exemplary cutting tool assembly including a tool holder including an end alignment cylinder and a fastener hole which is offset from a center of the assembly, in accordance with the present disclosure.
FIG. 10 illustrates the cutting tool assembly of FIG. 9 in sectional view, in accordance with the present disclosure.

FIG. 9 illustrates an alternative embodiment of an exemplary cutting tool assembly 310 including tool holder 312 and cutting tool body 320. Tool holder 312 includes a central portion including a cylindrical portion 330, trigon portion 340, and an end alignment cylinder 350. Tool holder 312 is configured to be inserted within a tool driver assembly, which provides input torque to the cutting tool assembly 310. Tool holder 312 is configured to removably affix the cutting tool assembly 310 to the tool driver assembly, providing a precisely controllable cutting tool edge or edges while enabling easy removal of the cutting tool assembly 310 from the tool driver assembly after a cutting task is complete. Longitudinal axis 355 is illustrated through a center of cutting tool assembly 310 about which the assembly is configured to spin.

The central portion can include different shapes such as cylindrical portion 330 which can include substantially parallel side walls. Fastener hole 332 permits a fastener to be used to lock the tool holder 312 into place within the tool driver assembly. Cutting tool body 320 includes a wider radius than cylindrical portion 330. Cylindrical portion 330 is attached to flat bottom face 322 of cutting tool body 320. Cylindrical portion 330 serves as a first contact point with the mating tool driver assembly, locating the cutting tool assembly through precise fitting of the cylinder shape to a mating cylinder cavity and fixing that spatial relationship with a fastener affixed though the tool driver assembly to fastener hole 332. The cylinder shape further prevents the cutting tool assembly 310 from canting or tilting within the tool driver assembly cavity, thereby preventing a tool lock condition.

Trigon portion 340 includes an eccentric drive member including a substantially curved triangular cross-section defined by three flatter arcuate faces separated by three rounded vertices. Trigon portion 340 is attached to bottom flat face 334 of cylindrical portion 330 and includes a flat bottom face 342. Trigon portion 340 is configured be inserted into a similar shaped trigon cavity within the mating tool driver assembly, wherein the cavity within the mating tool driver assembly is slightly larger than trigon portion 340. The triangular cross section of trigon portion 340, portion in other embodiments, can be substituted with an eccentric drive member with a similar oval or rounded square.

End alignment cylinder 350 is attached to flat bottom face 342 and further provides to align the tool holder 312 within the mating cavity and stop assembly 310 from canting while in use.

FIG. 10 illustrates the cutting tool assembly 310 of FIG. 9 in sectional view. Cylindrical portion 330 is illustrated in cross section through a point at a center of fastener hole 332.

Fastener hole 332 is illustrated in profile and includes a cone shaped lead in. Fastener hole 332 is perpendicular to longitudinal axis 355, being formed at a 90 degree angle into cylindrical portion 330 as compared to longitudinal axis 355. However, fastener hole 332 is offset to one side longitudinal axis 355, such that a centerline of fastener hole 332 is not in line with axis 355. As cutting tool assembly 310 is set within a mating cavity, a fastener being driven into fastener hole 332 acts to rotate cutting tool assembly slightly in the illustrated counter clockwise direction. This rotation sets the trigon portion of cutting tool assembly 310 firmly against the mating cavity to the trigon portion. This forced rotation further aligns assembly 310 within the mating cavity and reduces play in the part, such that use of assembly 310 to cut a work piece is less likely to result in assembly 310 being locked within the mating cavity.

Figure 11:
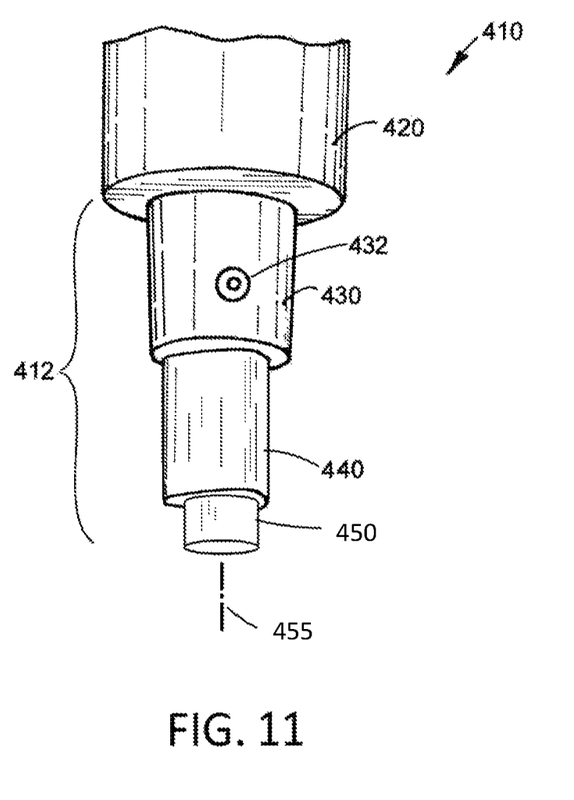
FIG. 11 illustrates an alternative embodiment of the cutting tool assembly of FIG. 9, with slightly angled walls, in accordance with the present disclosure.

FIG. 11 illustrates an alternative embodiment of the cutting tool assembly of FIG. 9, with slightly angled walls. Cutting tool assembly 410 includes tool holder 412 and cutting tool body 420. Tool holder 412 includes central portion 430, trigon portion 440, and an end alignment cylinder 450. Central portion 430 includes slightly angled walls and fastener hole 432. Fastener hole 432 is perpendicular to longitudinal axis 455, being formed at a 90 degree angle into central portion 430 as compared to longitudinal axis 455. However, fastener hole 432 is offset to one side longitudinal axis 455, such that a centerline of fastener hole 432 is not in line with axis 455.

Figure 12:
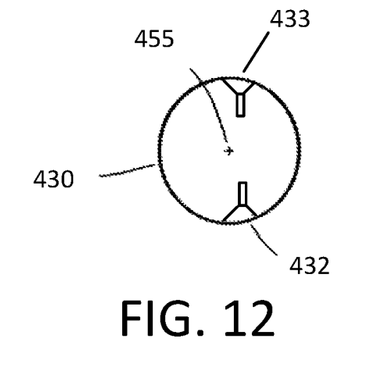
FIG. 12 illustrates the cutting tool assembly of FIG. 11 in sectional view, illustrating a first and a second fastener hole, each configured for a different tool spinning direction, in accordance with the present disclosure.

FIG. 12 illustrates the cutting tool assembly of FIG. 11 in sectional view, illustrating a first and a second fastener hole, each configured for a different tool spinning direction. Central portion 430 is illustrated in cross section through a point at a center of first fastener hole 432 and a center of second fastener hole 433. Fastener holes 432 and 433 are illustrated at a same longitudinal location on central portion 430. In other embodiments, fastener holes 432 and 433 can be at different longitudinal locations on the central portion. Fastener holes 432 and 433 are illustrated in profile and include cone shaped lead ins. Fastener holes 432 and 433 are each perpendicular to longitudinal axis 455, being formed at a 90 degree angle into central portion 430 as compared to longitudinal axis 455. However, fastener holes 432 and 433 are each offset to one side longitudinal axis 455. As cutting tool assembly 410 is set within a mating cavity, a fastener being driven into one of fastener holes 432 and 433 acts to rotate cutting tool assembly slightly in the direction of spinning.

Figure 13:
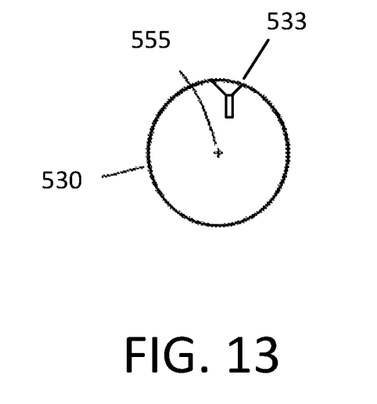
FIG. 13 illustrates an alternative exemplary cutting tool assembly in sectional view, with a fastener hole configured for a tool that rotates in an opposite direction from the cutting tool assembly of FIGS. 9 and 10, in accordance with the present disclosure.

Depending upon a tool spinning direction, either fastener hole 432 or 433 can be used. In one embodiment, either fastener hole 432 or fastener hole 433 can individually be formed in cutting tool assembly 410 in isolation of the other fastener hole. FIG. 13 illustrates an alternative exemplary cutting tool assembly in sectional view, with a fastener hole configured for a tool that rotates in an opposite direction from the cutting tool assembly of FIGS. 9 and 10. Central portion 530 is illustrated in cross section through a point at a center of fastener hole 533. Fastener hole 533 is illustrated in profile and includes a cone shaped lead in. Fastener hole 533 is perpendicular to longitudinal axis 555, being formed at a 90 degree angle into central portion 530 as compared to longitudinal axis 555.

Figure 14:
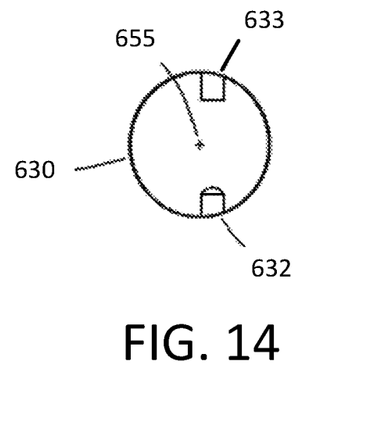
FIG. 14 illustrates an exemplary alternative embodiment to the cutting tool assembly of FIG. 12, illustrating alternative embodiments of the first and second fastener holes, in accordance with the present disclosure.

FIG. 14 illustrates an exemplary alternative embodiment to the cutting tool assembly of FIG. 12, illustrating alternative embodiments of the first and second fastener holes. Central portion 630 is illustrated in cross section through a point at a center of first fastener hole 632 and a center of second fastener hole 633. Fastener holes 632 and 633 are illustrated at a same longitudinal location on central portion 630. In other embodiments, fastener holes 632 and 633 can be at different longitudinal locations on the central portion. Fastener holes 632 and 633 are illustrated in profile. Fastener hole 632 includes a rounded end. Fastener hole 633 includes a squared end. Fastener holes 632 and 633 can each be perpendicular to longitudinal axis 655, being formed at a 90 degree angle into central portion 630 as compared to longitudinal axis 655.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An apparatus comprising a cutting tool assembly, comprising:
 a tool body; and
 a one-piece tool holder connected to the tool body, operable to transfer torque to the tool body, and comprising a longitudinal axis around which the tool holder is configured to spin, the one-piece tool holder comprising:
  a central portion with angled side walls connected to the tool body at a first end of the central portion and defining a fastener hole perpendicular with the longitudinal axis and configured to receive a securing fastener, wherein the fastener hole is offset from the longitudinal axis;
  an eccentric drive member connected at a first end of the eccentric drive member to a second end of the central portion; and
  a cylindrical portion connected to a second end of the eccentric drive member; and
 wherein the central portion, the eccentric drive member, and the cylindrical portion are each centered about the longitudinal axis.

2. The apparatus of claim 1, wherein the fastener hole comprises a first fastener hole; and
 wherein the central portion further comprises a second fastener hole offset from the longitudinal axis.

3. The apparatus of claim 2, wherein the first fastener hole and the second fastener hole are at a same longitudinal position on the central portion.

4. The apparatus of claim 1, wherein the fastener hole comprises a cone-shaped fastener hole.

5. An apparatus comprising a cutting tool assembly, comprising:
 a tool body; and
 a one-piece tool holder connected to the tool body, operable to transfer torque to the tool body, and comprising a longitudinal axis around which the tool holder is configured to spin, the one-piece tool holder comprising:
  a central portion with angled side walls connected to the tool body at a first end of the central portion and defining a cone-shaped fastener hole perpendicular with the longitudinal axis and configured to receive a securing fastener, wherein the cone-shaped fastener hole is offset from the longitudinal axis;
  an eccentric drive member connected at a first end of the eccentric drive member to a second end of the central portion; and an end alignment cylinder connected to a second end of the eccentric drive member; and wherein the central portion, the eccentric drive member, and the end alignment cylinder are each centered about the longitudinal axis.

\* \* \* \* \*